United States Patent
Margotta

(10) Patent No.: US 9,620,254 B2
(45) Date of Patent: Apr. 11, 2017

(54) REACTOR IN-CORE INSTRUMENT HANDLING SYSTEM

(71) Applicant: Westinghouse Electric Company LLC, Cranberry Township, PA (US)

(72) Inventor: Kenneth V. Margotta, Ellington, CT (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 497 days.

(21) Appl. No.: 13/860,728

(22) Filed: Apr. 11, 2013

(65) Prior Publication Data

US 2014/0307843 A1    Oct. 16, 2014

(51) Int. Cl.
| | |
|---|---|
| *G21C 17/10* | (2006.01) |
| *G21C 17/116* | (2006.01) |
| *G21C 19/19* | (2006.01) |
| *G21C 1/08* | (2006.01) |
| *G21C 1/32* | (2006.01) |

(52) U.S. Cl.
CPC ............ *G21C 17/10* (2013.01); *G21C 17/116* (2013.01); *G21C 19/19* (2013.01); *G21C 1/086* (2013.01); *G21C 1/322* (2013.01)

(58) Field of Classification Search
CPC ...... G21C 17/00; G21C 17/10; G21C 17/116; G21C 19/19
USPC ....................................................... 376/259
See application file for complete search history.

(56) References Cited

U.S. PATENT DOCUMENTS

| | | | |
|---|---|---|---|
| 3,769,156 A | 10/1973 | Brecy | |
| 3,827,935 A | 8/1974 | Grüner et al. | |
| 4,716,004 A | 12/1987 | Merkovsky | |
| 4,765,947 A | 8/1988 | Babin et al. | |
| 5,078,956 A | 1/1992 | Lunz | |
| 5,078,957 A | 1/1992 | Tower et al. | |
| 5,606,582 A | 2/1997 | Bergamaschi | |
| 8,888,524 B2 * | 11/2014 | Martin | H01R 13/72 439/502 |
| 2010/0150294 A1 * | 6/2010 | Weisel | G21C 13/02 376/245 |

FOREIGN PATENT DOCUMENTS

WO    2012/117779 A1    9/2012

OTHER PUBLICATIONS

Conway, Lawrence E., U.S. Appl. No. 13/457,683, filed Apr. 27, 2012, entitled "Instrumentation and Control Penetration Flange for a Pressurized Water Reactor," 21 pages.
Harkness, Alexander W., U.S. Appl. No. 13/742,392, filed Jan. 16, 2013, entitled "Method and Apparatus for Refueling a Nuclear Reactor Having an Instrumentation Penetration Flange," 32 pages.

(Continued)

*Primary Examiner* — Jack W Keith
*Assistant Examiner* — Lily C Garner
(74) *Attorney, Agent, or Firm* — Joseph C. Spadacene; Westinghouse Electric Company LLC

(57) ABSTRACT

A reactor in-core instrument handling system in which the signal leads are routed from the instrument sensors through an outer sheath through the upper reactor internals and out of and around the sheath in a substantially tightly wound spiral before exiting the reactor vessel.

8 Claims, 10 Drawing Sheets

(56) References Cited

OTHER PUBLICATIONS

Evans, Matthew C. et al., U.S. Appl. No. 13/495,050, filed Jun. 13, 2012, entitled "Pressurized Water Reactor Compact Steam Generator," 18 pages.

Harkness, Alexander W., U.S. Appl. No. 13/741,737, filed Jan. 15, 2013, entitled Apparatus and Method for Removing the Upper Internals From a Nuclear Reactor Pressurized Vessel, 29 pages.

International Search Report and Written Opinion of the International Searching Authority for PCT/US2014/021603 dated Dec. 12, 2014 (Forms PCT/ISA/220, PCT/ISA/210, PCT/ISA/237).

Westinghouse Electric Company LLC, EP14800351.0 Search Report Jul. 11, 2016, 5 pages.

\* cited by examiner

REACTOR IN-CORE INSTRUMENT HANDLING SYSTEM

BACKGROUND

1. Field

This invention relates in general to nuclear reactor systems, and, in particular, to in-core instrumentation for such systems, that pass through the upper internals of the reactor pressure vessel.

2. Related Art

In a nuclear reactor for power generation, such as a pressurized water reactor, heat is generated by fission of a nuclear fuel such as enriched uranium, and transferred to a coolant flowing through a reactor core. The core contains elongated nuclear fuel rods mounted in proximity with one another in a fuel assembly structure, through and over which coolant flows. The fuel rods are spaced from one another in co-extensive parallel arrays. Some of the neutrons and other atomic particles released during nuclear decay of the fuel atoms in a given fuel rod pass through the spaces between the fuel rods and impinge on the fissile material in adjacent fuel rods, contributing to the nuclear reaction and to the heat generated by the core.

Movable control rods are dispersed through the core to enable control of the overall rate of the fission reaction, by absorbing a portion of the neutrons passing between fuel rods, which otherwise would contribute to the fission reaction. The control rods generally comprise elongated rods of neutron absorbing material and fit into longitudinal openings or guide thimbles in the fuel assemblies running parallel to and between the fuel rods. Inserting a control rod further into the core causes more neutrons to be absorbed without contributing to the fission process in an adjacent fuel rod; and retracting the control rod reduces the extent of neutron absorption and increases the rate of the nuclear reaction and the power output of the core.

To monitor the neutron activities and coolant temperature within the core fuel assemblies, moveable in-core instrumentation has been employed in the past, such as moveable neutron detectors, that conventionally enter the core from penetrations in the bottom of the vessel. In a few instances in the past, leakage occurred at the penetrations at the bottom of the vessel which presented significant repair problems. It soon became apparent that it would be desirable to have all the in-core instrumentation access the core from above. Additionally, fixed in-core neutron detectors have been employed that enter the core through the bottom of the reactor vessel and reside in the fuel assemblies during normal operation. In addition to fixed in-core instrumentation that enter through penetrations in the bottom of the vessel, there are fixed in-core instrumentation that enter through penetrations in the top of the vessel. In this latter configuration, each in-core instrument thimble assembly is totally enclosed in a guide path composed of tubing. The lower portion of this guide path extends down into the fuel assembly. However, even the fixed in-core neutron detectors, and the thermocouple assemblies that are used to monitor temperature within the core, have to be withdrawn from the fuel assemblies before the reactor core can be accessed for refueling operations. Thus, it is therefore necessary to provide a structure which can satisfactorily guide and protect the in-core instrumentation entering from the top of the vessel and mitigate the potential for leakage while enabling access for refueling.

These objectives have become even more of a challenge for some small modular reactor designs such as the one being proposed by Westinghouse Electric Company LLC, Cranberry Township, Pa., in the 200 megawatt class. The small modular reactor is an integral pressurized water reactor with all primary loop components located inside the reactor vessel. The reactor vessel is surrounded by a compact high pressure containment. Due to both the limited space within the containment and the low cost requirement for integral pressurized light water reactors, the overall number of auxiliary systems needs to be minimized without compromising safety or functionality. For example, the compact, high pressure containment associated with the design of small modular reactors does not allow for the incorporation of a large floodable cavity above the reactor vessel in which the transferred components can be shielded. Furthermore, in most traditional pressurized water reactors, the in-core instrumentation is retracted from the core prior to refueling. This is done by breaking primary pressure boundary seals and pulling the instrumentation through a conduit tube. This procedure is straight forward in plants with bottom mounted instrumentation since the conduit just extends from the bottom of the reactor vessel to a seal table located in a room separated from the reactor. In plants with top mounted instrumentation, this procedure is much more challenging because of the upper internal structure. This is further complicated when top mounted instrumentation is considered for use in an integral pressurized water reactor of a small modular reactor system that has a heat exchanger and pressurizer integrally incorporated in the reactor head closure. Top mounted instrumentation is preferred in plants that use a severe accident mitigation strategy commonly referred to as in-vessel retention. This strategy requires that there are no penetrations in the lower portion of the reactor vessel.

U.S. patent application Ser. No. 13/457,683, filed Apr. 27, 2012, entitled "Instrumentation and Control Penetration Flange for a Pressurized Water Reactor," assigned to the Assignee of this Application, introduced a removable annular seal ring between the reactor head closure and the pressure vessel flange for routing cabling from the control rod drives and core monitoring instrumentation through the reactor vessel pressure barrier. U.S. patent application Ser. No. 13/742,392, filed Jan. 16, 2013, entitled "Method and Apparatus for Refueling a Nuclear Reactor Having an Instrumentation Penetration Flange," assigned to the Assignee of this Application, teaches one method of refueling such a reactor. Refueling is on the critical path of most outages in which it is a part and any means of making the method of refueling more efficient can substantially reduce the cost of such an operation to utility operators. Accordingly, further improvements in reducing the steps that have to be taken to remove the instrumentation from the core so that they can be removed with the upper internals and expose the fuel assemblies is desirable for both conventional reactors and integral modular reactors.

In conventional reactors, the in-core instruments are encased in a long stainless steel tube, referred to as an outer sheath, typically 30 to 40 feet (9.1 to 12.2 meters) long and approximately ⅜ of an inch (9.5 millimeters) in diameter. The outer sheath contains the instruments and the instrument leads. These lead wires extend the full length of the instrument and are terminated at one end in an electrical connector. The assembly of the instruments, instrument lead wires, outer sheath and electrical connector is called an in-core instrument thimble assembly. In the reactor, the end of the in-core instrument thimble assembly that has detectors in it, extends from the top of the fuel assembly, to almost the bottom, a distance in a conventional assembly of typically between 10 and 12 feet (3.05-3.66 meters). The non-active end of the in-core instrument thimble assembly contains lead wires that transmit the signal from the detectors to an electrical connector. In existing applications, the outer sheath of the in-core instrument thimble assembly passes through a vessel penetration. In more recent designs the penetration is usually in the reactor vessel's closure head, and the electrical connector is located outside of the reactor.

During a reactor refueling the in-core instrument thimble assemblies must be removed from the core to allow fuel repositioning. Some plant designs have an instrumentation grid assembly plate inside the reactor on an upper portion of the upper internals to which all of the in-core instrument thimble assemblies are attached. During the refueling, the instrumentation grid assembly plate is lifted and all of the in-core instrument thimble assemblies are withdrawn simultaneously from the reactor core. Other plants, that do not have an instrumentation grid assembly plate, withdraw each in-core instrument thimble assembly individually a sufficient distance to allow fuel movement. The withdrawn portion of the in-core instrument thimble assembly must be supported by an external means. Any change in structure of the in-core instrument thimble assemblies or the upper internals that will reduce the number of steps required to withdraw the in-core instrument thimble assemblies from the core will reduce the critical path refueling time and minimize the possibility of damaging the in-core instrument thimble assemblies due to a mishandling error. This especially true in the crowded environment of a small, integral modular reactor.

According, it is an object of this invention to modify the in-core instrument thimble assemblies in a way that will minimize the number of steps required to withdraw the in-core instrument thimble assemblies into the upper internals and remove the upper internals from above the reactor core.

It is a further object of this invention to provide such a modification that will minimize the number of times submerged electrical connectors need to be disassembled.

SUMMARY

These and other objects are achieved by a pressurized water nuclear reactor having a pressure vessel with an upper removable head for sealably engaging an upper opening in the pressure vessel. A core, having an axial dimension, is supported within the pressure vessel. A plurality of nuclear fuel assemblies are supported within the core with at least some of the fuel assemblies having at least one instrumentation thimble extending axially therethrough. An upper internals assembly is supported above the core and has axially extending instrumentation guide paths supported therethrough with each of the instrumentation thimbles that are configured to receive instrumentation through the upper internals assembly being aligned with one of the instrumentation guide paths. The upper internals further includes an instrumentation grid assembly plate supported above the instrumentation guide paths and axially moveable relative to a lower portion of the upper internals. At least one in-core instrumentation thimble assembly is provided that extends through a corresponding one of the instrumentation guide paths into an instrumentation thimble and is retractable into the upper internals assembly. The in-core instrumentation thimble assembly includes a lower section comprising a sensor region and an upper section through which signal cabling is routed, with both the lower section and the upper section being enclosed within an outer sheath. The outer sheath has an upper portion connected to the instrumentation grid assembly plate with the signal cabling extending through and around an outside of the outer sheath, at least partially through the instrumentation guide path and through a passage from the interior of the reactor vessel to an exterior thereof. Preferably, the signal cabling is coiled around the outside of an upper portion of the outer sheath and, desirably, the coil is in the form of a spiral spring.

In one embodiment, the passage from the interior to the exterior of the pressure vessel is through an outwardly extending flange on the upper internals assembly. Preferably, the instrumentation grid assembly plate is configured to move axially from a lower position to an upper position and the instrumentation guide paths are formed from a tubular housing that substantially extends up to the lower position. Preferably, in the latter arrangement, the instrumentation grid assembly plate in the upper position is spaced above the tubular housing. Alternately, an upper portion of the tubular housing is configured as the telescoping tube with an upper portion of the telescoping tube connected to the instrumentation grid assembly plate.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
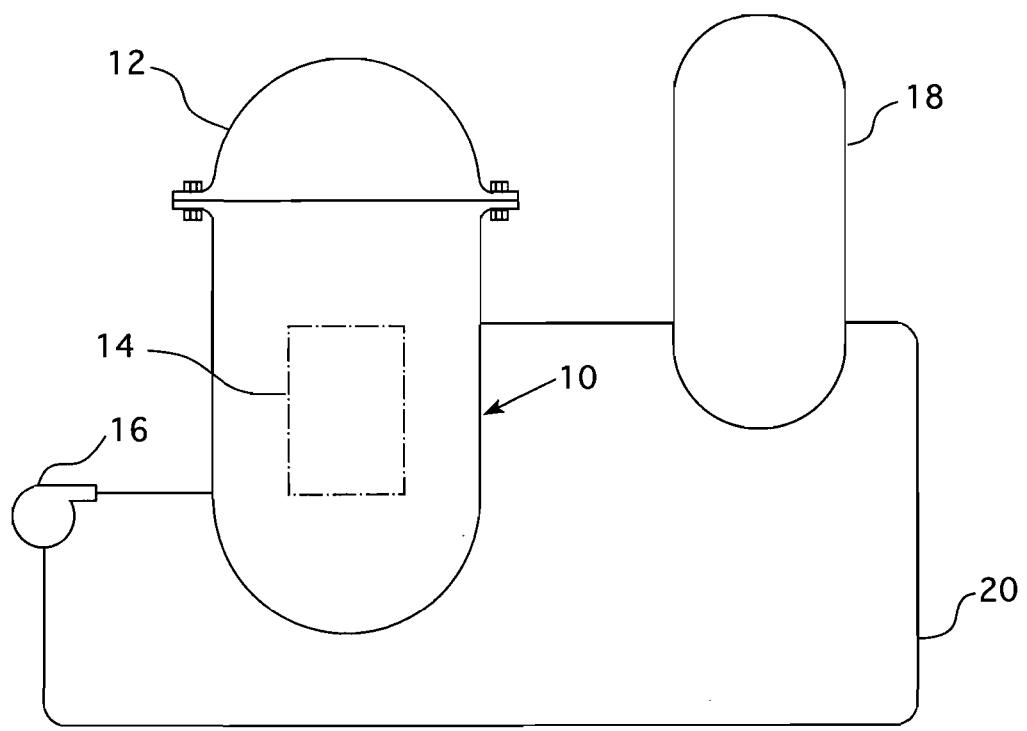
FIG. 1 is a simplified schematic of a nuclear reactor to which this invention can be applied.

Referring now to the drawings, FIG. 1 shows a simplified nuclear reactor primary system, including a generally cylindrical pressure vessel 10 having a closure head 12 enclosing a nuclear core 14. A liquid reactor coolant, such as water, is pumped into the vessel 10 by pump 16 through the core 14 where heat energy is absorbed and is discharged through a heat exchanger 18, typically referred to as a steam generator, in which heat is transferred to a utilization circuit (not shown) such as a steam driven turbine generator. The reactor coolant is then returned through pump 16, completing the primary loop. Typically, a plurality of the above-described loops are connected to a sealed reactor vessel 10 by reactor coolant piping 20.

Figure 2:
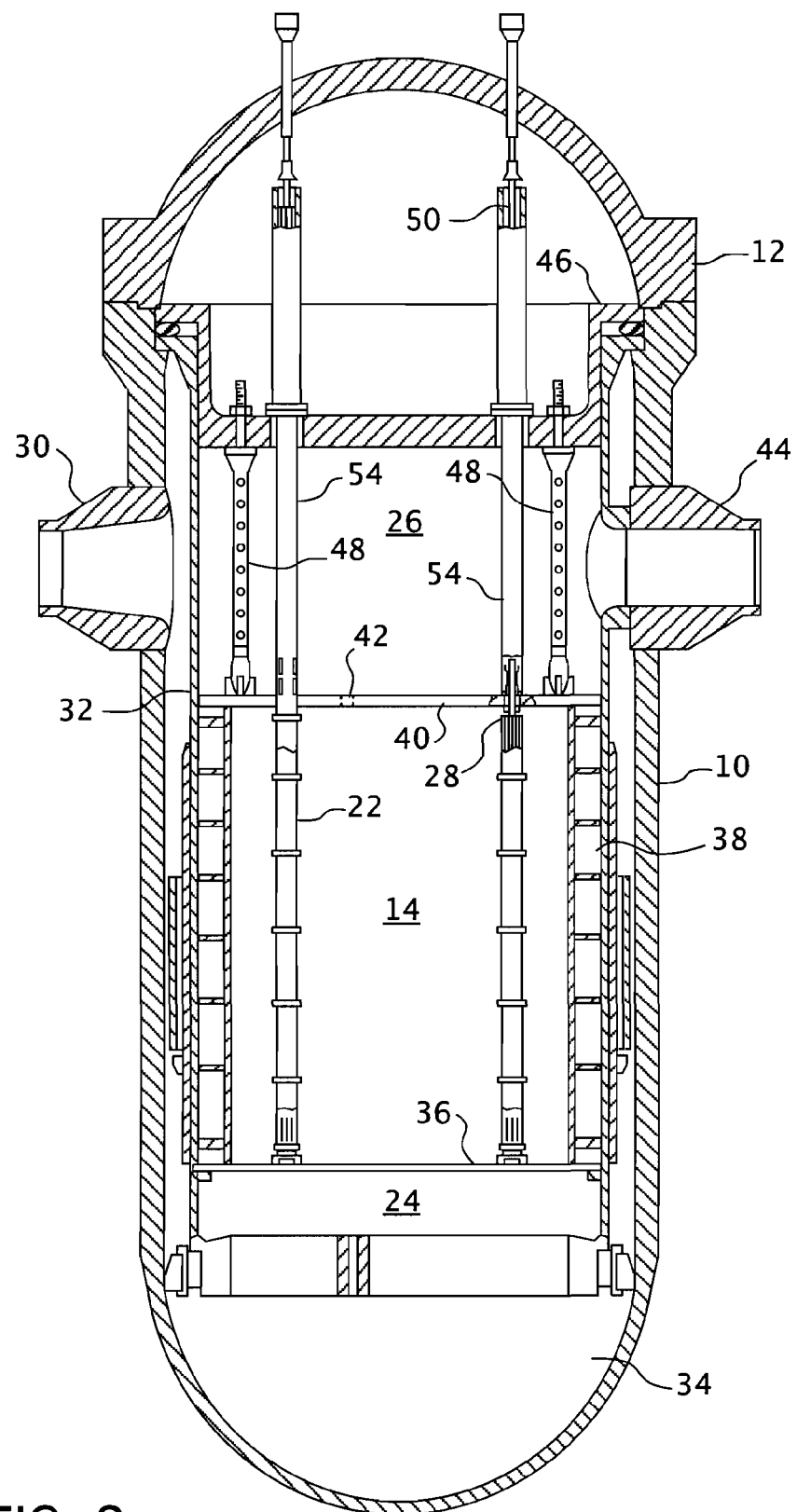
FIG. 2 is an elevational view, partially in section, of a conventional pressurized water reactor vessel and internal components to which this invention can be applied.

A conventional reactor design is shown in more detail in FIG. 2. As previously mentioned, though not shown in FIG. 2, in older conventional pressurized water reactor designs, the moveable or stationary in-core neutron detectors enter the core from the bottom of the reactor through tubes that extend from penetrations in the vessel bottom to the lower core plate 36 where they mate with the instrumentation tubes within the fuel assemblies. Furthermore, in such a traditional reactor design, thermocouples that measure core temperature enter the upper head 12 through a single penetration and are distributed by a yoke or cable conduit, such as shown in U.S. Pat. No. 3,827,935 to individual support columns 48 and thereby two various fuel assemblies.

In addition to the core 14, comprised of a plurality of parallel, vertical co-extending fuel assemblies 22, for purposes of this description, the other vessel internal structures can be divided into the lower internals 24 and the upper internals 26. In conventional designs, the lower internals function to support, align and guide core components and instrumentation, as well as direct coolant flow within the vessel. The upper internals restrain or provide a secondary restraint for fuel assemblies 22 (only two of which are shown for simplicity), and support and guide instrumentation and components such as control rods 28.

In the exemplary reactor shown in FIG. 2, coolant enters the reactor vessel 10 through one or more inlet nozzles 30, flows downward about a core barrel 32, is turned 180° in a lower plenum 34, passes upwardly through a lower core support plate 36 upon which the fuel assemblies 22 are seated, and through and about the assemblies. The coolant flow through the core and surrounding area 38 is typically large, in the order of 400,000 gallons per minute at a velocity of approximately 20 feet per second (6.1 meters per second). The resulting pressure drop and frictional forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially through one or more outlet nozzles 44.

The upper internals 26 can be supported from the reactor vessel 10 or the vessel closure head 12 and includes an upper support assembly 46 which is also referred to as the upper support plate. Loads are transmitted between the upper support plate 46 and the upper core plate 40 primarily by a plurality of support columns 48. A support column is aligned above a selected fuel assembly 22 and perforations 42 in the upper core plate 40 to provide access to elongated axial instrumentation tubes centrally located within each fuel assembly with the instrumentation tubes being co-extensive with the fuel assemblies' control rod guide thimbles.

Rectilinearly moveable control rods 28, typically including a drive shaft 50 and a spider assembly of neutron absorbing rods, are guided through the upper internals 26 and into aligned fuel assemblies 22 by control rod guide tubes 54. The guide tubes are fixedly joined to the upper support assembly 46 and connected by split pin force fed into the top of the upper core plate 40.

Figure 3:
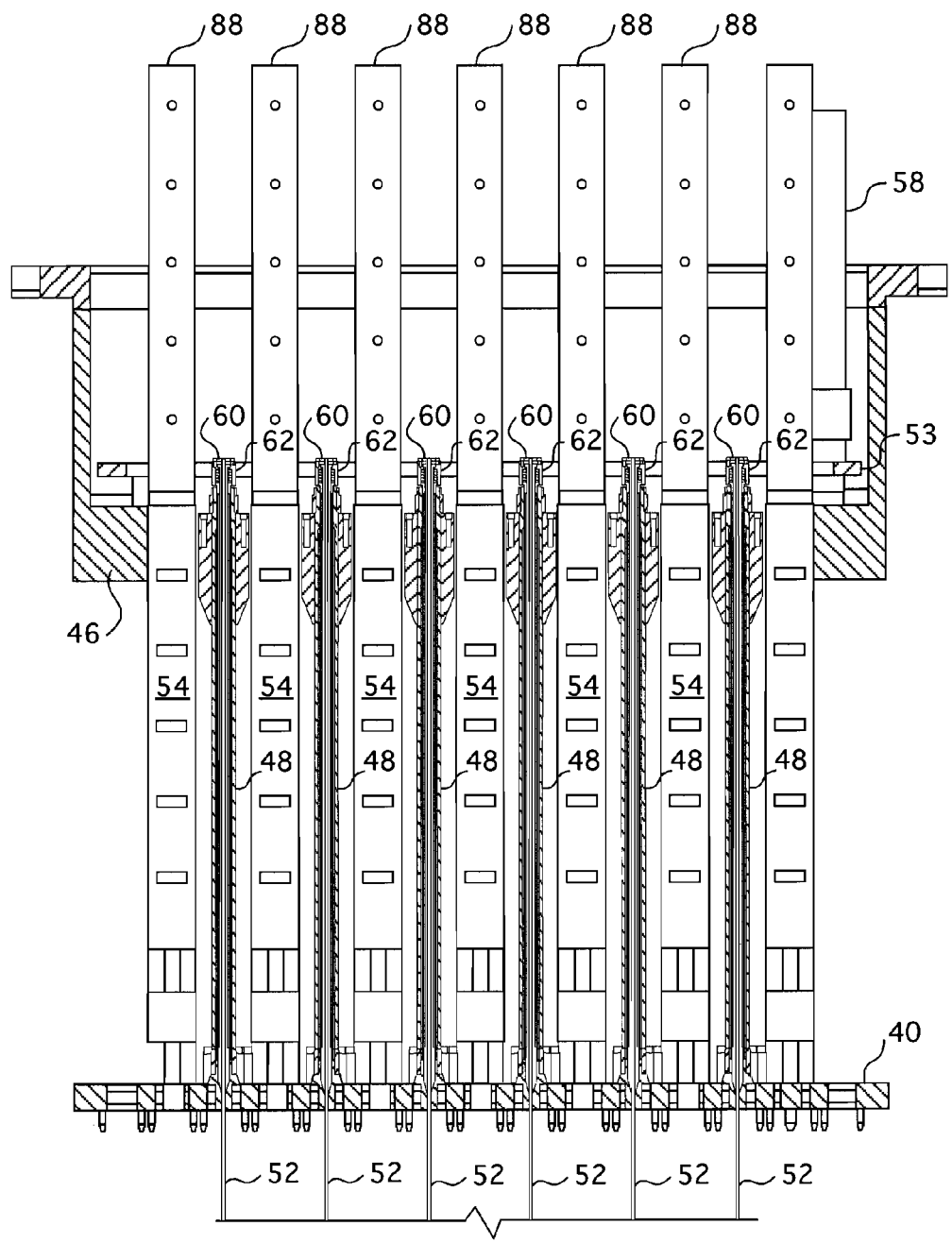
FIG. 3 is an elevational view, partially in section, of an upper internals package of one embodiment of a conventional pressurized water reactor showing the telescoping in-core instrumentation guide tubes, that can be employed with this invention, in a lowered position.

FIG. 3 provides an enlarged view of the upper internals package from which it can be clearly seen that the control rods, which extend from the head 12 through the upper internals package and into the core below the upper core plate 40, are guided substantially over the entire distance by the control rod guide tubes 54 and control rod guide tube extensions 88. However, the in-core instrumentation which are guided through the support columns 48 only receives support above the elevation of the reactor core between the upper core plate 40 and the upper support assembly 46. A substantial distance remains between the upper support assembly 46 and the head 12 over which the in-core instrumentation is exposed once it is withdrawn from the core.

Figure 4:
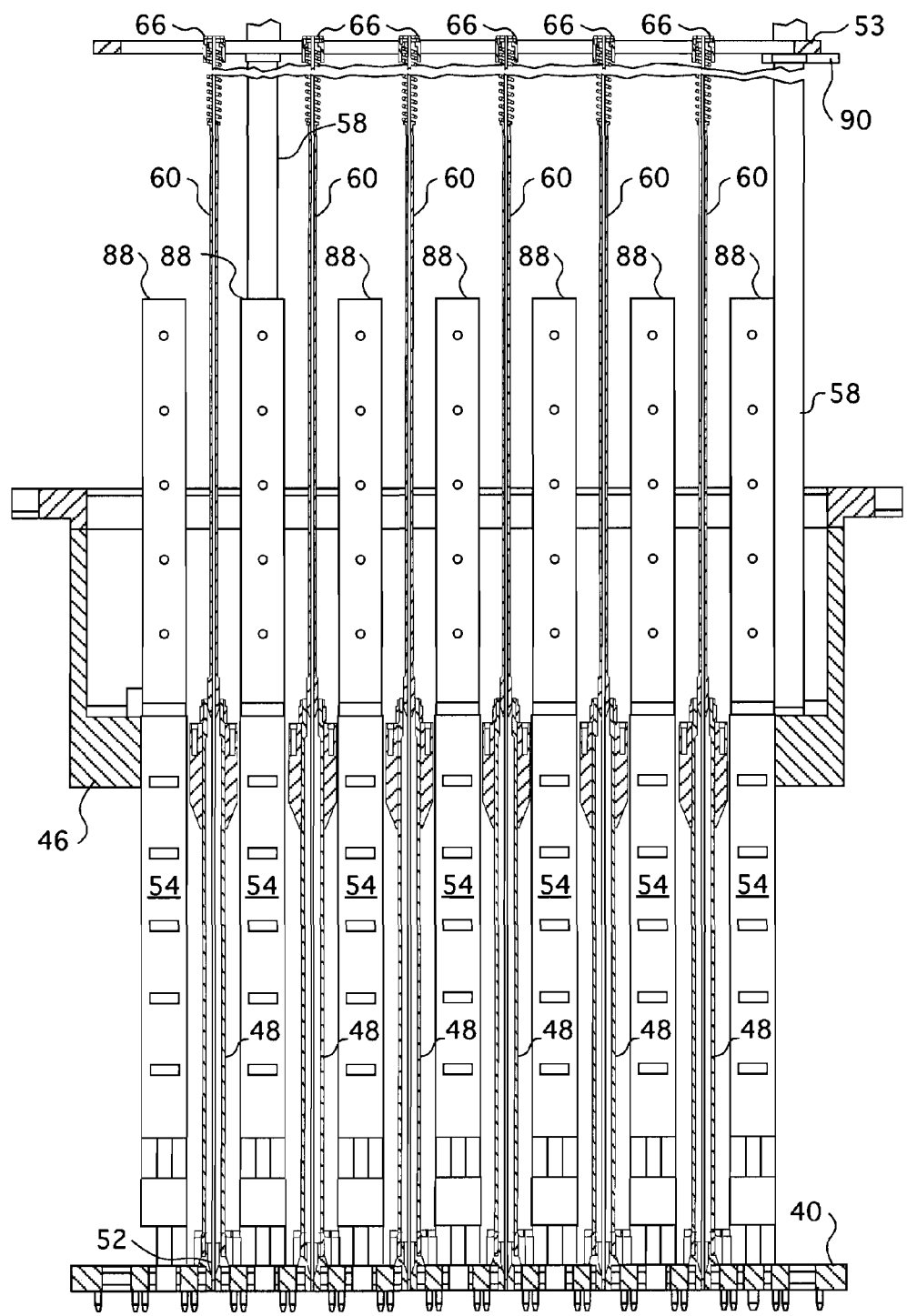
FIG. 4 is an elevational view, partially in section, of the upper internals package shown in FIG. 3 with the in-core telescoping instrumentation guide tubes in a raised position.

In the conventional embodiment shown in FIG. 3, some or all of the instrumentation is routed through one or more penetrations in the reactor head 12. This prior art embodiment provides a structural modification to earlier reactor models to provide support for the in-core instrument thimble assemblies 52 in their withdrawn position where they extend above the upper support plate 46. In this prior art embodiment, the support columns 48 are provided with a slidable sleeve 60 that is extendable from the upper portion 62 of the support columns 48 into the area above the upper support plate 46 to support the in-core instrument thimble assemblies 52 when they are withdrawn from the fuel assemblies 22 to gain access to the core. In reactors such as the AP1000® supplied by Westinghouse Electric Company LLC, Cranberry Township, Pa., the length of withdrawal required to raise the in-core instrument thimble assemblies 52 to the mid plane of the upper core plate 40 is typically larger than the height of the support columns 48 which leaves the highly irradiated upper portion of the in-core instrument thimble assemblies 52 exposed above the upper support plate 46, unguided and potentially subject to damage. Typically, in the AP1000® design, the in-core instrument thimble assemblies 52 need to be raised approximately 185 inches (470 cms.). The slidable sleeves 60 are designed to extend to support the exposed area of the in-core instrument thimble assemblies 52 above the upper support plate 46. An instrumentation grid assembly plate 53 is attached to the upper ends of the slidable sleeve 60 and is guided by the pins 58 and fixed in an upper position by the swing clamp 90. FIG. 3 shows the instrument grid assembly 53 in its lower position and FIG. 4 shows the instrument grid assembly 53 in its upper position to raise the in-core instrument thimble assemblies out of the core. This prior art embodiment is more fully described in U.S. Patent Publication No. 2010/0150294, published Jun. 17, 2010.

Figure 5:
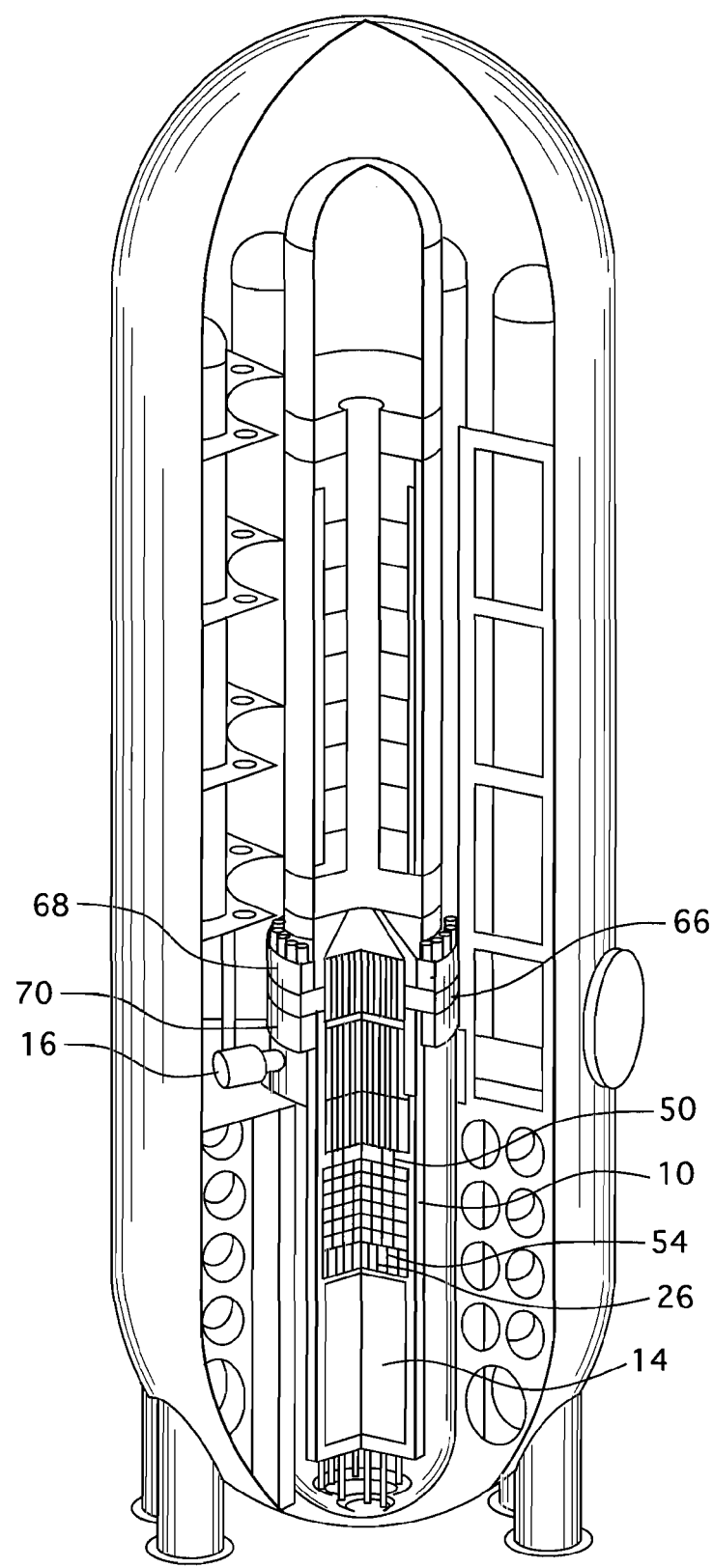
FIG. 5 is a perspective view partially cut away, showing a small modular reactor system that can benefit from this invention.
Figure 6:
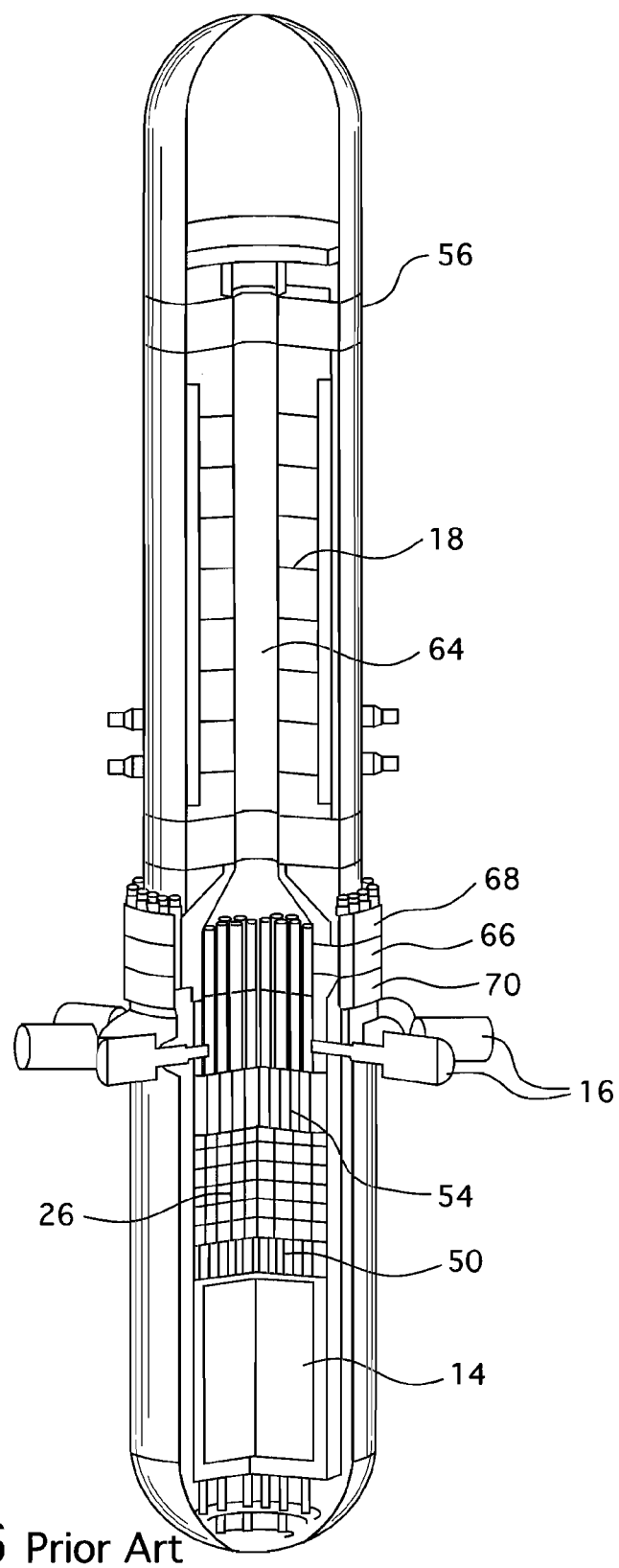
FIG. 6 is an enlarged view of the reactor shown in FIG. 5.

FIGS. 5 and 6 illustrate a schematic of a small modular reactor which is more fully described in U.S. patent application Ser. No. 13/457,683, filed Apr. 27, 2012, entitled "Instrumentation and Control Penetration Flange for Pressurized Water Reactor." FIG. 5 shows a perspective view, partially cut away, to show the pressure vessel and its internal components. FIG. 6 is an enlarged view of the pressure vessel shown in FIG. 5. A pressurizer 56 of which usually one is included in each pressurized water nuclear reactor system, regardless of the number of loops, though not shown in FIG. 1, for maintaining the pressure in the system, is integrated into the upper portion of the reactor vessel head in the integral, modular reactor shown in FIGS. 5 and 6 and eliminates the need for a separate component. It should be appreciated that the same reference characters are employed for corresponding components among the several figures. A hot leg riser 64 directs primary coolant from the core 14 to a steam generator 18 which surrounds the hot leg riser 64. A number of coolant pumps 16 are circumferentially spaced around the reactor vessel 10 at an elevation near the upper end of the upper internals 26. The reactor coolant pumps 16 are horizontally mounted axial flow canned motor pumps. The reactor core 14 and the upper internals 26, except for their size, are substantially the same as the corresponding components previously described with regards to FIGS. 1 and 2. From the foregoing, it should be apparent that the traditional means for routing the cabling from the upper internal components to the exterior of the reactor cannot readily be employed. Some small modular reactor designs also require electrical power to be supplied to internal components such as control rod drive mechanisms, reactor coolant pumps, and pressurizer heaters. U.S. patent application Ser. No. 13/457,683, filed Apr. 27, 2012, entitled, "Instrumentation and Control Penetration Flange for Pressurized Water Reactor" describes an alternative location for all reactor penetrations, including electrical power, through a ring 66 that is clamped between the upper and lower reactor vessel closure flanges 68 and 70, respectively (FIGS. 5 and 6). The penetration flange 66 provides a convenient means of reactor vessel disassembly and reassembly during plant refueling operations and allows for inspection and maintenance of the in-vessel components. In the following description, the preferred embodiment of the invention claimed hereafter will be described in the context of a specific small integral reactor design, however, it should be recognized that the novel elements of this invention can be applied to other reactors, including conventional pressurized water reactors whether or not they have similar design restrictions.

Figure 7:
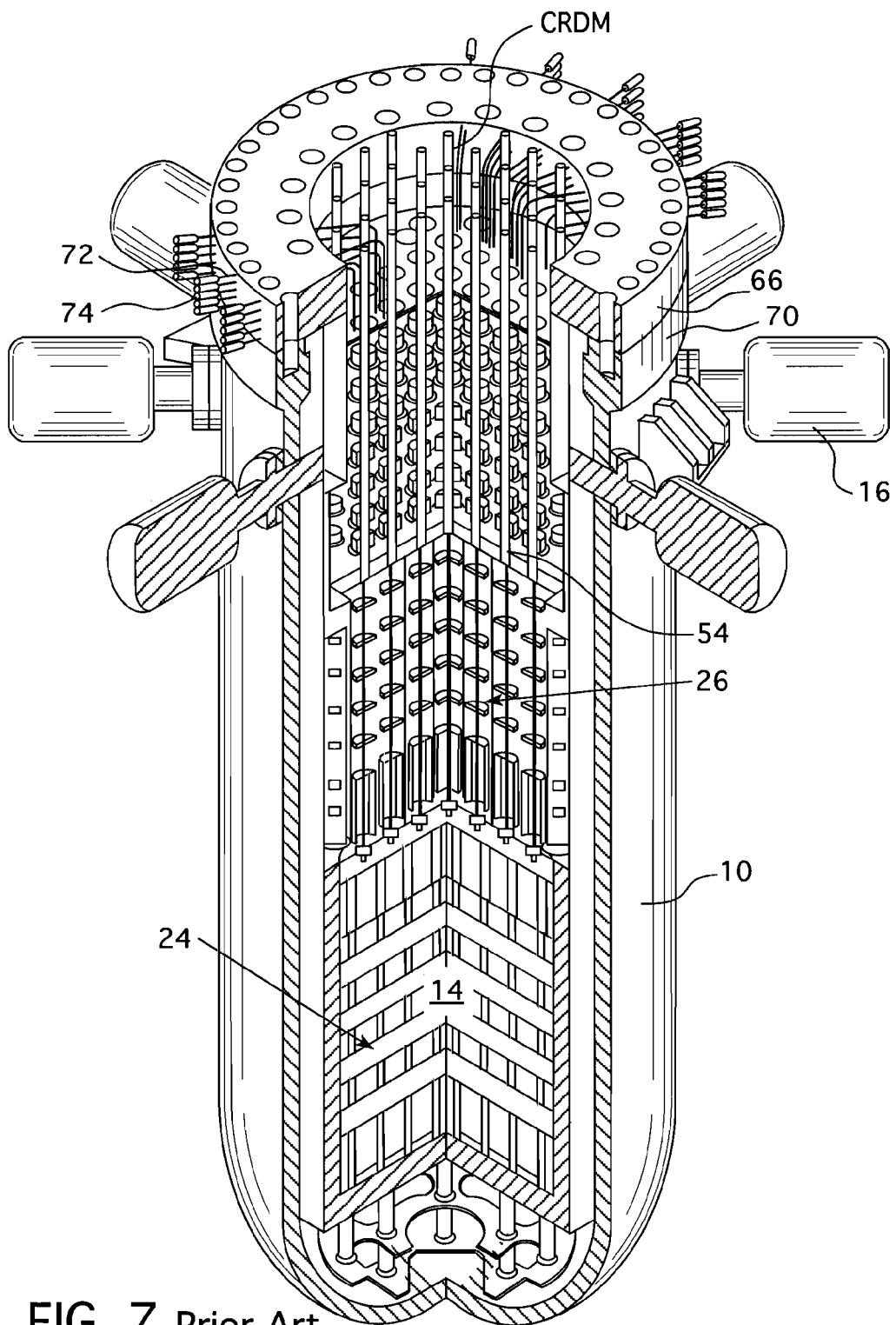
FIG. 7 is a perspective view of the reactor vessel and its internal components shown in FIGS. 5 and 6, with a portion cut away to show the internals.

FIG. 7 shows a reactor vessel 10 and its internal components, including the lower internals 24, that includes the core 14, and upper internals 26, that includes the control rod guide tubes, the drive rod housings 54 and the control rod drive mechanisms (CRDM). The annular penetration flange seal 66 has radially extending ports 72 through which utility conduits 74 transport electrical power, instrumentation signals, control signals or hydraulic fluids to or from the interior of the pressure vessel to the exterior thereof. The signal cabling from the in-core instrumentation in the preferred embodiments of this invention would be conveyed through these utility conduits. While the arrangement of penetrations through the flange 66 will be a function of the requirements of a particular reactor design, in the small modular reactor internals design described in the afore cited patent application Ser. No. 13/457,683, axial passages are positioned towards the inner diameter of the penetration seal ring 66 to allow return coolant flow from the steam generator 18 to pass through the penetration 66. The operation of the small modular integral reactor described herein can be better understood by reference to co-pending U.S. patent application Ser. No. 13/495,050, filed Jun. 13, 2012, entitled "Pressurized Water Reactor Compact Steam Generator."

Figure 8:
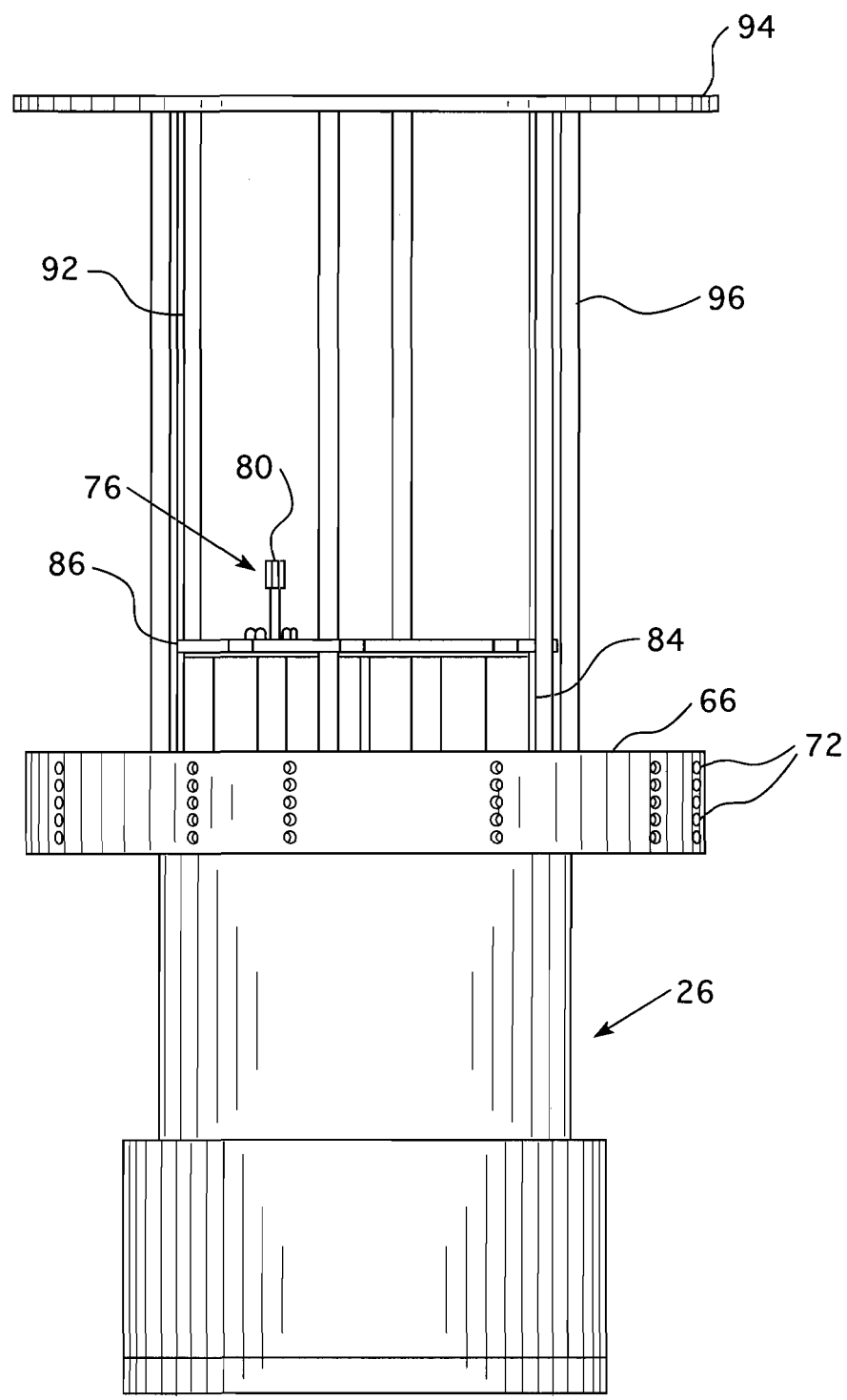
FIG. 8 is a schematic view of an upper internals structure incorporating one embodiment of this invention shown with the instrumentation grid assembly plate in a lowered position.
Figure 9:
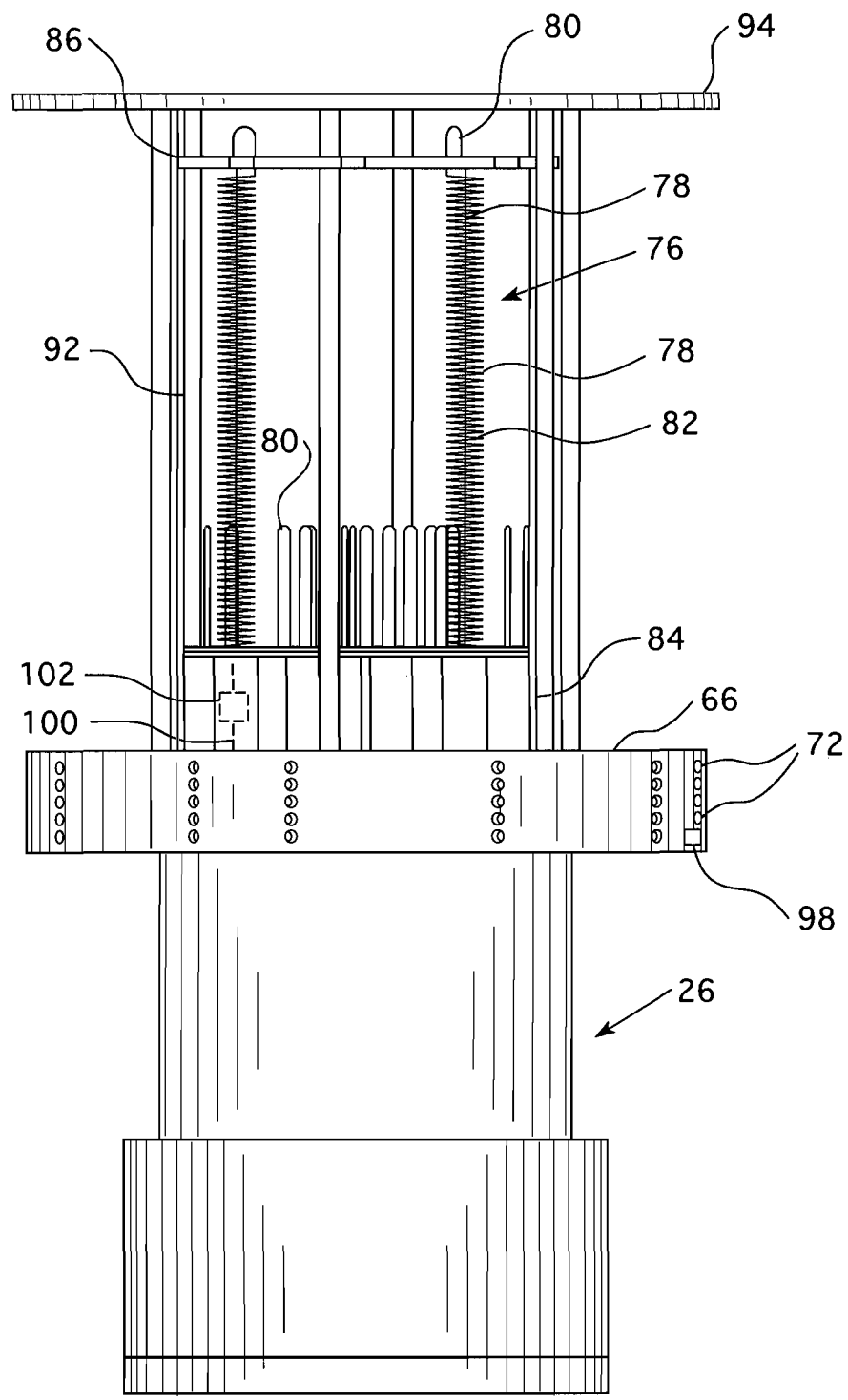
FIG. 9 is the schematic view shown in FIG. 8 with the instrumentation grid assembly plate shown in a raised position.

This invention provides a modification to the in-core instrument thimble assemblies that typically monitor core power and core coolant exit temperature. This modification reduces the number of underwater electrical cabling disconnects and reconnects that need to be performed during a refueling operation; a procedure that is difficult and time consuming. FIGS. 8 and 9 show a schematic view of the upper internals incorporating one embodiment of this invention. The in-core instrument thimble assembly in accordance with this invention is constructed in two separate sections, a lower section 100 and an upper section 76. The lower section has all the active sensors formed in a traditional arrangement and fits within the instrument thimble in a fuel assembly within the core. The upper part of the lower section terminates in an electrical connector 102. The upper sections 76 still has an outer sheath 78, but the signal leads 80 extend through the outer sheath 78 and is formed into a relatively large coiled spring 82 around the outer sheath 78, approximately 8 inches (20.32 cms.) in diameter and approximately 50 inches (127 cms.) long. The remaining part of the upper section houses a relatively straight (not coiled) signal lead that extends substantially all the way down to the lower section 100 of the instrument thimble assembly 52, routed in a traditional manner. The coiled portion of the electrical signal lead 82 is wrapped around the outer sheath 78 and extends down to and through the utility ports 72 within the penetration flange 66. Both ends of the upper section 76 of the in-core instrument thimble assemblies 52 have electrical connectors. The upper section 76 only contains instrument lead wires and is essentially an extension cord for the in-core instrument thimble assembly. The lower portion of the upper section 76 of the in-core instrument thimble assembly 52 is connected to a complimentary portion of the electrical connector 102, which couples with a mating portion of the electrical connector 102 on the lower section 100 of the in-core instrument thimble assembly 52 which has the detectors and instrument signal wires housed within a stainless steel outer sheath in a conventional arrangement.

FIG. 8 shows the in-core instrument thimble assembly upper section 76 housed within a protective tube 84 which extends up to just under an instrument grid assembly plate 86. The instrument grid assembly plate 86 is axially moveable and travels on plate lift guides 92 between a lower position shown in FIG. 8 and an upper position shown in FIG. 9. An instrument grid assembly lift rig 94 has axially extending legs 96 which rest upon the penetration flange 66 and is employed to raise and lower the instrument grid assembly plate 86 which is attached to each of the upper portions of the upper sections 76 of the in-core instrument thimble assemblies 52, raising and lowering each of the in-core instrument thimble assemblies 52 simultaneously respectively out of or into the core.

FIG. 9 shows a schematic representation of the upper internals 26 with the instrument grid assembly plate 86 raised in an upper position with the signal leads 80 that exit the upper portion of the outer sheath wrapped around the outer sheath in a tight spiral that extends substantially from the top of the outer sheath 78 to within the protective tube 84, where the signal lead exits the reactor vessel through the penetration flange 66. An electrical connector 98 may also be provided outside the penetration flange to connect cabling that will convey the signal to the control room. However, it should be appreciated that in accordance with this invention the signal cables and connector external to the pressure side of the penetration flange 66 will travel with the penetration flange when it is moved to its storage location during a refueling outage, so there is no reason to make a disconnect to facilitate the refueling process. There are other electrical disconnects in the system that are further from the reactor that allow the penetration flange to be disconnected from plant wiring in order to move the penetration flange. In existing plants there are two disconnects required to access the lower internals in this concept there is only one that is necessary for that purpose. The dotted, axially extending line 100, shown on the left protective tube 84, represents the lower section 100 of the in-core instrument thimble assembly that was raised from the core, which is connected to the upper portion 76 by an electrical connector 102. Once the in-core instrument thimble assemblies have been raised to the upper position, the upper internals 26 may be removed from the core to expose the fuel assemblies for refueling.

Thus, in accordance with this invention, the electrical connector 102 between the upper section 76 of the in-core instrument thimble assembly and the active detector section 100, need not be disconnected as part of the refueling process except where replacement of the lower section is necessary, which is infrequent. This gives the system the following advantages. The electrical connector 102 between the two in-core instrument thimble assembly sections 76 and 100 remains joined during a plant refueling and no underwater disconnects need to be made. The coiled section of the in-core instrument thimble assembly allows the instrument grid assembly plate 86 to be raised sufficiently (approximately 10 feet (3.05 meters)) to remove all the in-core instrument thimble assemblies from the fuel without disconnecting the connector; the in-core instrumentation thimble assembly coil elongates as the instrument plate 86 is raised. In contrast, in existing plants, the electrical connector is outside the reactor vessel and must be disconnected to allow disassembly of the reactor components for plant refueling. This improved arrangement eliminates both the critical path time and labor required to perform this operation and the radiation exposure plant workers incur in order to accomplish the electrical connector assembly and disassembly. In existing reactor designs, protective devices (bullet noses) must be installed over disassembled electrical connectors since they are typically stored under water during refueling activities. The bullet noses are used to protect the in-core instrument thimble assembly electrical connectors and to guide the in-core instrument thimble assemblies through the reactor closure head when the head is removed or installed. The invention claimed hereafter eliminates the need for the electrical connector protection and the critical path time and labor required to perform this operation and the radiation exposure of plant workers incurred in order to accomplish the electrical connector assembly and disassembly. One electrical connector of the upper section of the in-core instrument thimble assembly is outside of the reactor. An advantage of this invention is that this electrical connector can also remain joined to the instrument wiring that is external to the vessel. This external wiring is typically mounted on the closure head lift rig structure and must normally be disconnected from the in-core instrument thimble assembly instruments in the vessel. This invention eliminates both the critical path time and labor required to perform this operation and the radiation exposure plant workers incur in order to accomplish the electrical connector assembly and disassembly. Furthermore, in existing plants instrument guide tubes are mounted to some internal structure of the reactor. Some plants have a complex instrument grid assembly plate (typically 10 to 12 feet (3.05-3.67 meters) in diameter) that all of the instrument guide tubes are mounted on. Some plants route the individual instrument guide tubes through the upper internals and attach them to other structures. The in-core instrument thimble assemblies are inserted into these guide tubes and they direct each in-core instrument thimble assembly from the head penetration to the specific fuel assembly to be monitored. Depending on the size and the design of the plant, there are typically 30 to 60 in-core instrument thimble assemblies in a system. This invention eliminates the instrument guide tubes. The instrument cable itself is hardwired onto the plant upper internals so it does not have to be withdrawn from the upper internals during refueling and can be removed with the upper internals.

During initial plant assembly, the upper section 76 of the in-core instrument thimble assembly will be semi-permanently installed onto the reactor internals. Under normal circumstances, the upper section should not have to be replaced for the lifetime of the plant but a provision should be made to allow replacement if necessary. Each in-core instrument thimble assembly outer sheath 78 will be fastened into supports such as the protective tubes 84 to protect it from the high velocity reactor coolant flow through the plant. The lower section of the in-core instrument thimble assembly 100 is installed into the reactor internals and then the electrical connectors 102 of the upper section and the lower section will be coupled. The detectors inside the lower section 100 of the in-core instrument thimble assembly will become depleted over time, due to neutronic interactions during plant operation, and therefore the lower section must be replaced after approximately ten fuel cycles. Since the upper section contains only lead wires, it does not have to be replaced under normal plant operating conditions.

As mentioned above, during a plant refueling, the in-core instrument thimble assemblies must be removed from the fuel assemblies in order to allow fuel replacement or repositioning within the reactor vessel. In accordance with this invention, all of the in-core instrument thimble assemblies are connected to the instrument grid assembly plate 86. The external lift rig, schematically shown by reference character 94 in FIGS. 8 and 9, that is used to remove the upper internals from the reactor vessel, is also attached to the instrument grid assembly plate 86 and raises it to an elevation sufficient to pull the in-core instrument thimble assemblies out of the fuel (FIG. 9). Instrument plate 86 is locked in the raised position. Then the lift rig 94 moves the upper internals and the raised instrument grid assembly plate to a storage location to allow fuel movement activities. An example of such a lifting rig is described in U.S. patent application Ser. No. 13/741,737, filed Jan. 15, 2013, entitled "Apparatus and Method for Removing The Upper Internals From a Nuclear Reactor Pressurized Vessel.

Buckling of the in-core instrument thimble assemblies is prevented by the use of a telescoping guide tube that leads the in-core instrument thimble assemblies out of and back into the fuel. The telescoping tubes supports are fastened to the instrument grid assembly plate 86 in the manner described in U.S. Patent Publication No. 2010/0150294, referenced above.

Figure 10:
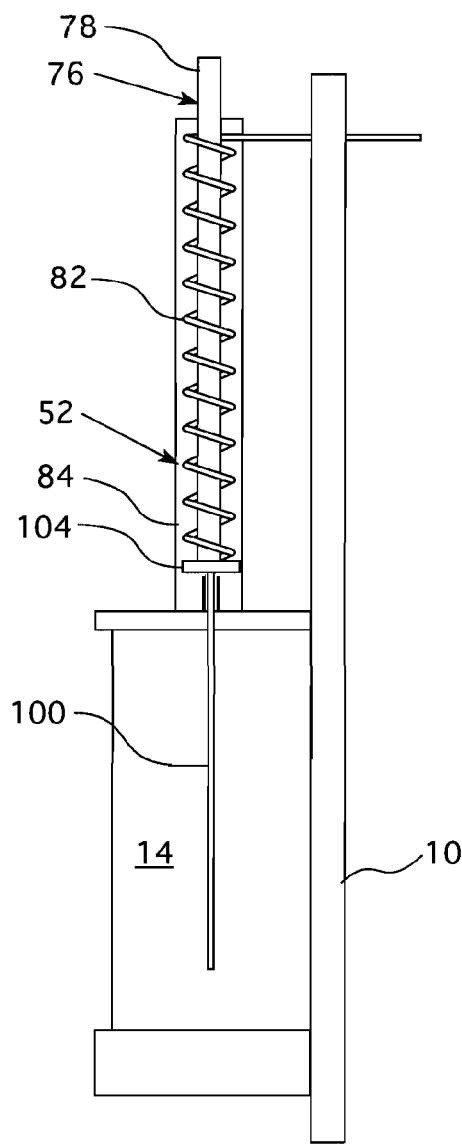
FIG. 10 is a schematic view of a portion of the interior of a reactor vessel showing another embodiment of the instrument thimble assembly of this invention with the lower portion of the instrument thimble assembly inserted in the core.
Figure 11:
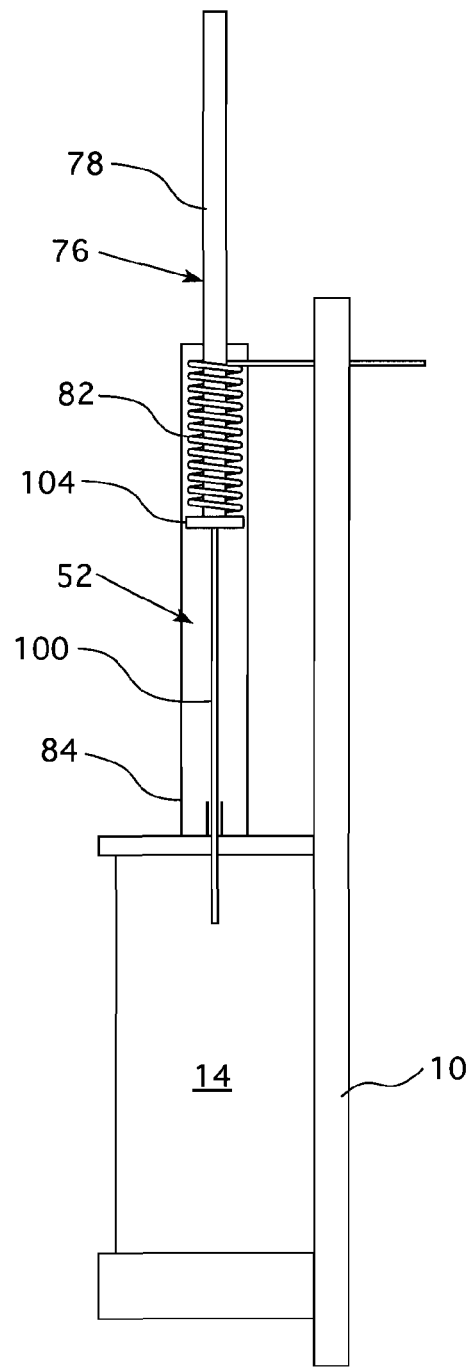
FIG. 11 is a schematic view of the portion of the reactor vessel shown in FIG. 10 with the lower portion of the instrument thimble assembly partially withdrawn from the core.

It should be apparent that other variations of the design of the instrument thimble assembly and upper internals can be implemented without departing from the intent of this invention. FIGS. 10 and 11 illustrate one such variation, with FIG. 10 showing the lower portion of the instrument thimble assembly 100 inserted into the core and FIG. 11 showing the same arrangement with the instrument thimble assembly substantially removed from the core. In this embodiment diameter of the outer sheath 78 around the upper section of the in-core instrument thimble assembly 52 is larger than the outer sheath around the lower section 100. The larger diameter sheath forms a more convenient mandrel for wrapping the signal lead and can accommodate larger runs of a signal lead. In the embodiment shown in FIGS. 10 and 11, the outer sheath of the upper section 76 has a round radially extending lip 104 at the bottom which guides and centers the in-core instrument assembly within the protective tube 84. The signal lead exits the sheath just above the lip 104 and spirals around the outer sheath until the elevation of the vessel 10 penetration through which it exits the vessel.

Thus, while specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A pressurized water nuclear reactor comprising:
a pressure vessel;
an upper removable head for sealably engaging an upper opening in the pressure vessel;
a core having an axial dimension supported within the pressure vessel;
a plurality of nuclear fuel assemblies supported within the core, at least some of the fuel assemblies having at least one instrumentation thimble extending axially therethrough;
an upper internals assembly supported above the core and having axially extending instrumentation guide paths supported therethrough with each of the instrumentation thimbles that are configured to receive instrumentation through the upper internals assembly being aligned with one of the instrumentation guide paths, the upper internals assembly including an instrumentation grid assembly plate supported above the instrumentation guide paths and axially movable relative to a lower portion of the upper internals; and
at least one in-core instrumentation thimble assembly extending through a corresponding one of the instrumentation guide paths into an instrumentation thimble, the in-core instrumentation thimble assembly having an upper portion connected to the instrumentation grid assembly plate and retractable with raising of the instrumentation grid assembly plate to move a portion of the in-core instrumentation thimble assemblies within the instrumentation thimbles, into the upper internals assembly, the in-core instrumentation thimble assembly including a lower section comprising a sensor region and an upper section through which signal cabling is routed, both the lower section and the upper section being enclosed within an outer sheath that encloses the corresponding instrument guide path, the outer sheath having an upper portion connected to the instrumentation grid assembly plate with the signal cabling extending at least partially through the instrumentation guide path, through and around an outside of the outer sheath, making a plurality of revolutions around the outer sheath prior to extending through a passage from the interior of the reactor vessel to an exterior thereof, with the number of revolutions sufficient to stretch along an extended length of the outer sheath as the outer sheath is extended with a raising of the instrumentation grid assembly plate to remove the in-core instrumentation thimble assembly from the corresponding instrument thimble, without disconnecting the signal cabling that was housed within the pressure vessel and upper removable head.

2. The pressurized water nuclear reactor of claim 1 wherein the signal cabling is coiled around the outside of an upper portion of the outer sheath.

3. The pressurized water nuclear reactor of claim 2 wherein the coil is in the form of a spiral spring.

4. The pressurized water nuclear reactor of claim 1 wherein the passage from the interior to the exterior of the pressure vessel is an outwardly extending flange on the upper internals assembly.

5. The pressurized water nuclear reactor of claim 1 wherein the instrumentation grid assembly plate is configured to move axially from a lower position to an upper position and the instrumentation guide paths are formed from a tubular housing that substantially extends up to the lower position.

6. The pressurized water nuclear reactor of claim 5 wherein the instrumentation grid assembly plate in the upper position is spaced above the tubular housing.

7. The pressurized water nuclear reactor of claim 6 wherein an upper portion of the tubular housing is configured as a telescoping tube with an upper portion of the telescoping tube connected to the instrumentation grid assembly plate.

8. The pressurized water nuclear reactor of claim 1 wherein the signal cabling exits the outer sheath below an upper end of the outer sheath.

* * * * *